(12) United States Patent
Ramesh et al.

(10) Patent No.: US 9,170,748 B2
(45) Date of Patent: Oct. 27, 2015

(54) SYSTEMS, METHODS, AND COMPUTER PROGRAM PRODUCTS PROVIDING CHANGE LOGGING IN A DEDUPLICATION PROCESS

(71) Applicant: NetApp, Inc., Sunnyvale, CA (US)

(72) Inventors: Bharadwaj Vellore Ramesh, Bangalore (IN); Venkata Vijay Chaitanya Challapalli, Sunnyvale, CA (US); Rohini Raghuwanshi, Bangalore (IN); Praveen Killamsetti, Sunnyvale, CA (US); Sudhanshu Gupta, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/509,892

(22) Filed: Oct. 8, 2014

(65) Prior Publication Data
US 2015/0026424 A1   Jan. 22, 2015

Related U.S. Application Data

(63) Continuation of application No. 13/568,822, filed on Aug. 7, 2012, now Pat. No. 8,949,561.

(51) Int. Cl.
G06F 7/00 (2006.01)
G06F 17/00 (2006.01)
G06F 3/06 (2006.01)
G06F 11/14 (2006.01)

(52) U.S. Cl.
CPC .............. *G06F 3/0641* (2013.01); *G06F 3/067* (2013.01); *G06F 3/0619* (2013.01); *G06F 11/1453* (2013.01)

(58) Field of Classification Search
CPC .......... G06F 11/2074; G06F 17/30138; G06F 11/1464; G06F 11/1471; G06F 11/1453
USPC ......................................................... 711/162
See application file for complete search history.

(56) References Cited

U.S. PATENT DOCUMENTS

| 8,095,756 | B1 | 1/2012 | Somavarapu et al. | |
| 2012/0158670 | A1* | 6/2012 | Sharma et al. | 707/692 |

OTHER PUBLICATIONS

Alvarez, C., "NetApp Deduplication for FAS and V-Series Deployment and Implementation Guide," Jan. 2010.

* cited by examiner

*Primary Examiner* — Aimee Li
*Assistant Examiner* — Edmund Kwong
(74) *Attorney, Agent, or Firm* — Kacvinsky Daisak Bluni PLLC

(57) ABSTRACT

A method performed in a network storage system, the method including receiving a plurality of data blocks at a secondary storage subsystem from a primary storage subsystem, generating a first log that includes a first plurality of entries, one entry for each of the data blocks, in which each entry of the first plurality of entries includes a name for a respective data block and a fingerprint of the respective data block, receiving metadata at the secondary storage subsystem from the primary storage subsystem, the metadata describing relationships between the plurality of blocks and a plurality of files, generating a second log that includes a second plurality of entries, and merging the first log with the second log to generate a change log.

20 Claims, 3 Drawing Sheets

US 9,170,748 B2

SYSTEMS, METHODS, AND COMPUTER PROGRAM PRODUCTS PROVIDING CHANGE LOGGING IN A DEDUPLICATION PROCESS

PRIORITY

This application is a continuation of U.S. application Ser. No. 13/568,822, filed Aug. 7, 2012, titled "Systems, Methods, and Computer Program Products Providing Change Logging In A Deduplication Process", the entire disclosure of which is hereby incorporated by reference in its entirety.

TECHNICAL FIELD

The present description relates, in general, to backup operations in network storage systems and, more specifically, to techniques for providing change logging in a deduplication process.

BACKGROUND

It is common for enterprises to backup their data from time to time. For instance, a business may have one or more storage volumes that are backed up daily or weekly in order to preserve records and/or to provide data recovery in the event that one or more of the storage volumes becomes inoperable or inaccessible.

Backup devices may store very large amounts of data, and therefore it may be desirable in some instances to perform deduplication before backing up data from a primary volume to a backup volume. To the extent that data can be deduplicated, the removal of the duplicate data may in some cases provide significant storage space savings.

Some conventional techniques for network storage implement file systems that employ pointers to point to the underlying data. The underlying data is arranged in data blocks. A given file may point to multiple blocks, and a block may be associated with multiple files. Furthermore, a given file may include data that is duplicated in another file. For instance, a storage volume may include multiple email inboxes, each inbox including a particular email attachment. In most scenarios it would be undesirable to backup multiple copies of the email attachment because doing so would be wasteful of storage resources. Some conventional deduplication operations avoid saving multiple copies of a piece of data by keeping only a single copy of the data and replacing the duplicate copies with pointers to the single copy. Therefore, multiple files are associated with the same data, but duplicate copies of the data are avoided.

Deduplication operations may include a change logging function to indicate the data that is being added to a backup volume. To implement the change logging function a particular deduplication operation may include a fingerprinting process to create an identifier for each data block that is to be backed up. In some examples, the fingerprinting process includes a hash operation to create a data string for each data block—if two blocks have the same data string (i.e., have the same fingerprint) it is an indication that the blocks are probably the same. The change log includes the fingerprints of the data that is to be backed up, and a backup manager application can compare the fingerprints to each other to determine whether any of the data blocks listed in the change log are duplicates.

However, as backup operations become more complex and sophisticated, such simple, conventional deduplication operations may benefit from updating.

BRIEF DESCRIPTION OF THE DRAWINGS

The present disclosure is best understood from the following detailed description when read with the accompanying figures.

SUMMARY

Figure 1:
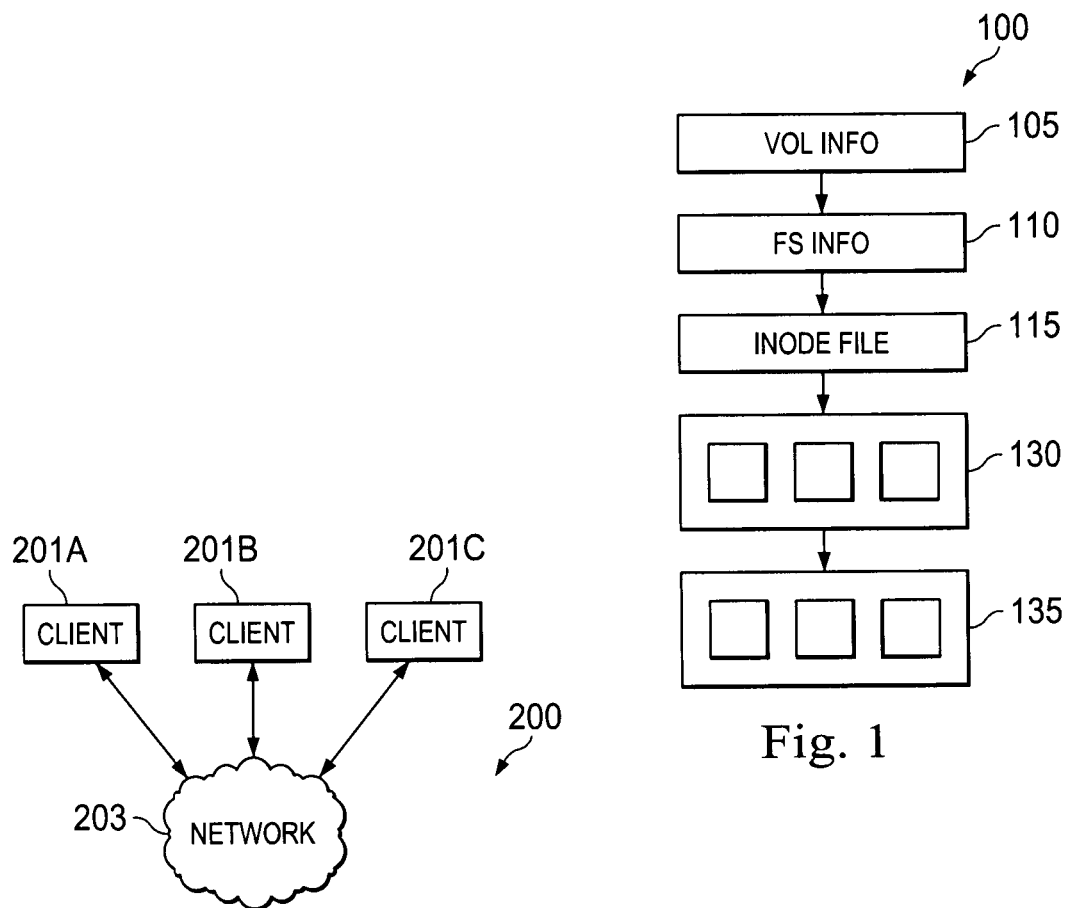
FIG. 1 is an illustration of an example file system configuration that may be used with one or more embodiments.

Various embodiments include systems, methods, and computer program products providing change logging in a network storage system. In one example, an embodiment generates a first log during a phase in which the data blocks are transferred and generates a second log in the phase where the file metadata is transferred. The first log includes the fingerprints of the data blocks, and the second log includes information that associates the data blocks with the files. The example embodiment generates the change log by merging the two logs so that the change log includes entries that each has a fingerprint of a data block and information associating that data block with a file.

One of the broader forms of the present disclosure involves a method performed in a network storage system, the method including receiving a plurality of data blocks at a secondary storage subsystem from a primary storage subsystem, generating a first log that includes a first plurality of entries, one entry for each of the data blocks, in which each entry of the first plurality of entries includes a name for a respective data block and a fingerprint of the respective data block, receiving metadata at the secondary storage subsystem from the primary storage subsystem, the metadata describing relationships between the plurality of blocks and a plurality of files, generating a second log that includes a second plurality of entries, in which each entry of the second plurality of entries includes a name for one of the data blocks, a metadata descriptor of one of the files, and a number identifier of one of the data blocks within one of the files, and merging the first log with the second log to generate a change log.

Another of the broader forms of the present disclosure involves a computer program product having a computer readable medium tangibly recording computer program logic for administrating data backup in a network storage system that has a primary storage subsystem and backup storage subsystem, the computer program product including code to transfer a plurality of data blocks to the backup storage subsystem, code to generate a data log for the plurality of data blocks, the data log having a first plurality of entries, each entry including block name and block fingerprint for a respective block, code to transfer information relating the plurality of data blocks to the plurality of files from the primary storage subsystem to the secondary storage subsystem, code to generate a reference log using the information relating the plurality of data blocks to the plurality of files, the reference log including a second plurality of entries, each entry including block name for one of the data blocks, metadata describing one of the files, and a number representing an order of the one of the data blocks within the one of the files, code to merge the data log and the reference log to create a change log with at least one entry for each of the data blocks, and code to perform deduplication by using the change log to check for duplication within the plurality of data blocks.

Another of the broader forms of the present disclosure involves a system including a storage subsystem, and one or more processors operatively coupled with the storage subsystem to administer data backup and deduplication, the one or more processors executing code to perform the following operations: processing a plurality of files for backup up at the storage subsystem in a first phase and a second phase, in which the first phase includes transferring a plurality of data blocks and creating fingerprints for the data blocks, and in which the second phase includes transferring metadata relating the plurality of blocks to the plurality of files, creating a first log including entries for each of the data blocks, each entry of the first log listing a block name and a fingerprint, creating a second log including entries associating the plurality of blocks with the plurality of files, each entry listing a block name, metadata describing a file, and a number identifier of a block within a file, and merging the first log and second log to generate a change log including entries associating a respective file with a respective number identifier and a fingerprint.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

It is understood that various embodiments may be implemented in any kind of network environment. For example, some embodiments may be implemented in a TCP/IP network connecting multiple clients and multiple servers. Other embodiments may be implemented in more specialized environments, such as in a Network Attached Storage (NAS), a Storage Area Network (SAN), or any other network storage configuration. Various embodiments are not limited to any particular network architecture or purpose and may be adapted for use in a wide-ranging array of environments.

Next-generation network storage systems may implement a two-phase transfer during the backup process. In the first phase, the individual data blocks are transferred to the backup volume. In the second phase, the metadata that describes the files (e.g., describing how the files relate to the blocks) is transferred to the backup volume. The backup volume saves the data and metadata with a file system structure that is the same as that used in the primary volume.

However, the two-phase information transfer may affect how deduplication and, in particular change logging, should be approached. For instance, generating a change log from the file information itself may result in the creation of an unnecessary multiplicity of entries where different files point to the same underlying data blocks. On the other hand, a change log in a file system may be best implemented with file information included in the entries, but the file information cannot be gleaned from the data blocks alone. Therefore, it may not be optimal to generate the change log from the information in the data phase only. It would be desirable to have a solution that provides efficient change logging in a file system backup process that has a multi-phase information transfer.

Various embodiments disclosed herein provide techniques to perform efficient change logging in a system that uses a multi-phase transfer of information from the storage volume to the backup volume. As mentioned above, the first phase includes transferring the data blocks from the source (storage volume) to the destination (backup volume). In one example, a backup manager application at the storage server and/or a deduplication engine at a backup device creates fingerprints of the blocks that are transferred. The backup manager and/or deduplication engine generates a first log (referred to hereinafter as the data log) that has a multitude of entries. Each of the entries includes at least a block name and a fingerprint of the respective block identified by the block name. In this example, block name includes a virtual volume block number, which is an index of a particular block within the storage volume. For instance, if the storage volume includes one thousand data blocks, the blocks may be numbered 0 to 999, each block having its own virtual volume block number. However, various embodiments may include any naming convention to identify the data blocks of a storage volume.

Further as mentioned above, the second phase of the information transfer includes transferring metadata from the storage volume to the backup volume that associates the data blocks with files in the file system. In order to illustrate the second phase, a brief discussion of a file system is provided in FIG. 1. The file system 100 of FIG. 1 is exemplary only, and the volume that is backed up may include the entirety, or only a portion, of the data and metadata in file system 100.

In this example, a file system includes a way to organize data to be stored and/or retrieved, and file system 100 is one example of a file system that can be used with the embodiments disclosed herein. A storage operating system carries out the operations of a storage system (e.g., system 200 of FIG. 2) to save and/or retrieve data within file system 100. Vol info 105 is a base node and has a pointer to the fs info 110. In this example vol info 105 includes data about the volume including the size of the volume, volume level options, language, etc. Fs info 110 includes pointers to inode file 115. Inode 115 includes data structures (inodes) with information about files in Unix and other file systems. Each file has an inode and is identified by an inode number (i-number) in the file system where it resides. Inodes provide important information on files such as user and group ownership, access mode (read, write, execute permissions) and type. An inode points to the file blocks or indirect blocks of the file it represents. Inode file 115 describes which blocks are used by each file, including metafiles. The inode file 115 is described by the fs info block 110, which acts as a special root inode for the file system. Fs info 110 captures the states used for backup, such as the locations of files and directories in the file system.

File system 100 is arranged hierarchically, with vol info 105 on the top level of the hierarchy, fs info block 110 below vol info 105, and inode file 115 below fs info block 110. The hierarchy includes further components at lower levels. At the lowest level are data blocks 135, which include user data as well as some lower-level metadata. Between inode file 115 and data blocks 135, there may be one or more levels of indirect storage blocks 130. Thus, while FIG. 1 shows only a single level of indirect storage blocks 130, it is understood that a given embodiment may include more than one hierarchical level of indirect storage blocks, which by virtue of pointers eventually lead to data blocks 135. A primary volume and/or a backup volume may be implemented using the file system configuration of FIG. 1.

Continuing with the example of the two-phase information transfer for backup, the first phase transfers data blocks, creates fingerprints, and generates a data log. The second phase of the information transfer includes transferring metadata from the storage volume to the backup volume that associates the data blocks with files in the file system. In one example, the backup volume receives Modes, file block numbers associated with the Modes, and block names of the blocks associated with the file block numbers. A file block number is a number that indexes a data block within a particular file. For instance, if a particular file is associated with two underlying data blocks, one data block may have the file block number 0 and the other may have the file block number 1. The block names are the same as those described above with respect to the first phase and can include a virtual volume block number, which is an index of a particular block within the storage volume.

The backup manager then generates a second log (hereinafter referred to as the reference log), which has a multitude of entries. Each of the entries includes an Mode for a particular file, a file block number of a data block associated with that particular file, and a name for the data block.

Both the data log and the reference log have a data block name in each entry. Tables 1 and 2 below provide example illustrations of a data log and a reference log, respectively. The backup manager then correlates entries of the data log with entries of the reference log by matching the data block names in the entries. The backup manager uses the correlations to generate a change log. Continuing with the example, the change log includes a multitude of entries, where each entry has an Mode representing a file, a file block number for a data block associated with the respective file, and a fingerprint of the data block. See Table 3 below for an example change log. Each of the data blocks transferred to the backup volume is represented in the change log by file block number and fingerprint. The backup manager application may then perform deduplication using the change log, as described above.

Figure 3:
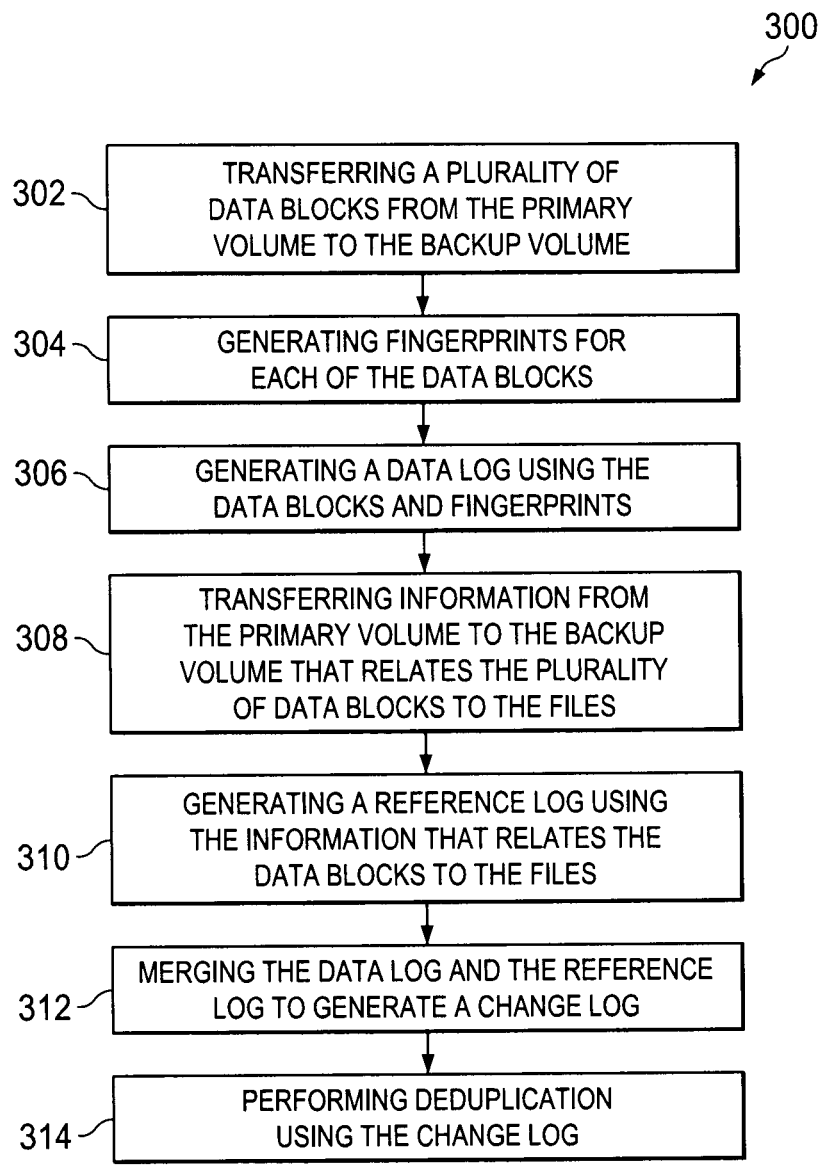
FIG. 3 is an illustration of an example method for performing backup and deduplication according to one or more embodiments.

The example discussed above is described in more detail with respect to FIG. 3. The above described example is intended to be non-limiting. For instance, various embodiments may use a different block naming system than the virtual volume block numbers and may identify a data block within a file using a scheme other than a file block number. The concepts of the present disclosure may be applied to any of a variety of network storage systems, regardless of any specific naming convention. Furthermore, the scope of embodiments is not limited to the file system of FIG. 1, as any appropriate file system may be used.

Figure 2:
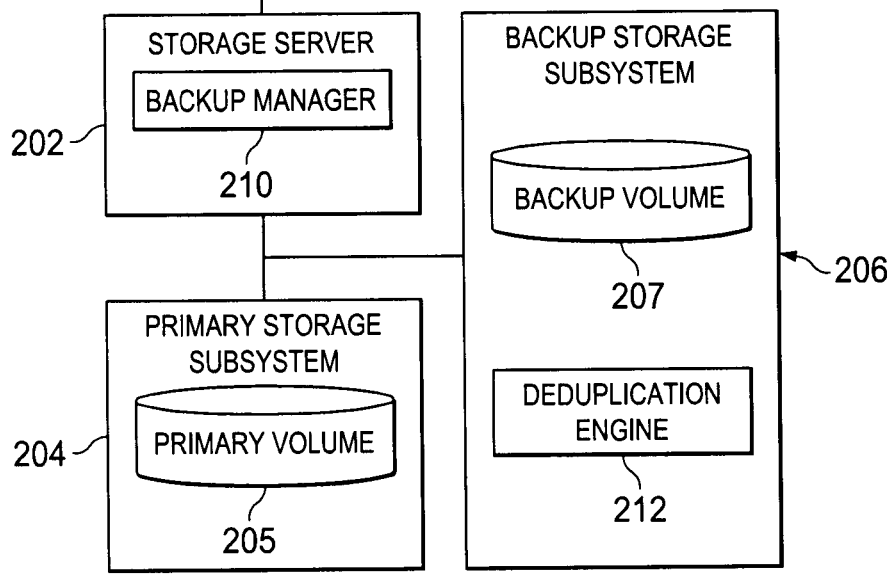
FIG. 2 is an illustration of an example network storage system that may implement various techniques according to the embodiments disclosed herein.

FIG. 2 is an illustration of an example network storage system 200 implementing a storage operating system (not shown) in which various embodiments may be implemented. Storage server 202 is coupled to a set of clients 201 through a network 203. The network 203 may include, for example, a local area network (LAN), wide area network (WAN), the Internet, a Fibre Channel fabric, or any combination of such interconnects. The server 202, the primary storage subsystem 204, and the backup storage subsystem 206 may be connected to a common communication and data transfer infrastructure, such as Fibre Channel, and may collectively comprise a SAN or a NAS.

Each of the clients 201 may include, for example, a personal computer (PC), server computer, a workstation, handheld computing/communication device or tablet, and/or the like. FIG. 2 shows three clients 201a-c, but the scope of embodiments can include any appropriate number of clients.

One or more of clients 201 may act as a management station in some embodiments. Such client may include management application software that is used by a network administrator to configure storage server 202, to provision storage in primary storage subsystem 204, and to perform other management functions related to the storage network, such as scheduling backups, setting user access rights, and the like.

The storage server 202 manages the storage of data in the primary storage subsystem 204. The storage server 202 handles read and write requests from the clients 201, where the requests are directed to data stored in, or to be stored in, primary storage subsystem 204. Primary storage subsystem 204 is not limited to any particular storage technology and can use any storage technology now known or later developed. For example, primary storage subsystem 204 has a number of nonvolatile mass storage devices (not shown), which may include conventional magnetic or optical disks or tape drives, non-volatile solid-state memory, such as flash memory; or any combination thereof. In one particular example, the primary storage subsystem 204 may include one or more Redundant Array of Independent Disks (RAIDs). In this example, primary storage subsystem includes one or more virtual volumes represented here by primary volume 205.

Similarly, storage server 202 handles backup operations at backup storage subsystem 206. Specifically, storage server 202 includes backup manager application 210, which executes instructions to backup data from primary volume 205 to backup volume 207 according to the method of FIG. 3. As explained further below, the backup operations include deduplication operations. Also, backup storage subsystem 206 is not limited to any particular storage technology, but may use conventional magnetic or optical disks or tape drives, non-volatile solid-state memory, such as flash memory, one or more RAIDs, or any combination thereof. Backup volume 207 may include one or more virtual volumes.

The storage server 202 may allow data access according to any appropriate protocol or storage environment configuration. In one example, storage server 202 provides file-level data access services to clients 201, as is conventionally performed in a NAS environment. In another example, storage server 202 provides block-level data access services, as is conventionally performed in a SAN environment. In yet another example, storage server 202 provides both file-level and block-level data access services to clients 201.

In some examples, one or more functions of backup manager 210 (e.g., deduplication operations) may be implemented by hardware and/or software at backup storage subsystem 206, such as by deduplication engine 212. The storage operating system runs on server 202 and provides backup manager 210, and in various embodiments storage subsystems 204 and 206 may include specialized hardware and/or software, compatible with the storage operating system, to accomplish backup and deduplication.

System 200 is shown as an example only. Other types of hardware and software configurations may be adapted for use according to the features described herein.

FIG. 3 is an illustration of exemplary method 300 adapted according to one embodiment. Method 300 may be performed by backup manager 210 and/or deduplication engine 212 (both of FIG. 2) to back up a volume from a primary storage subsystem to a backup storage subsystem.

Figure 4:
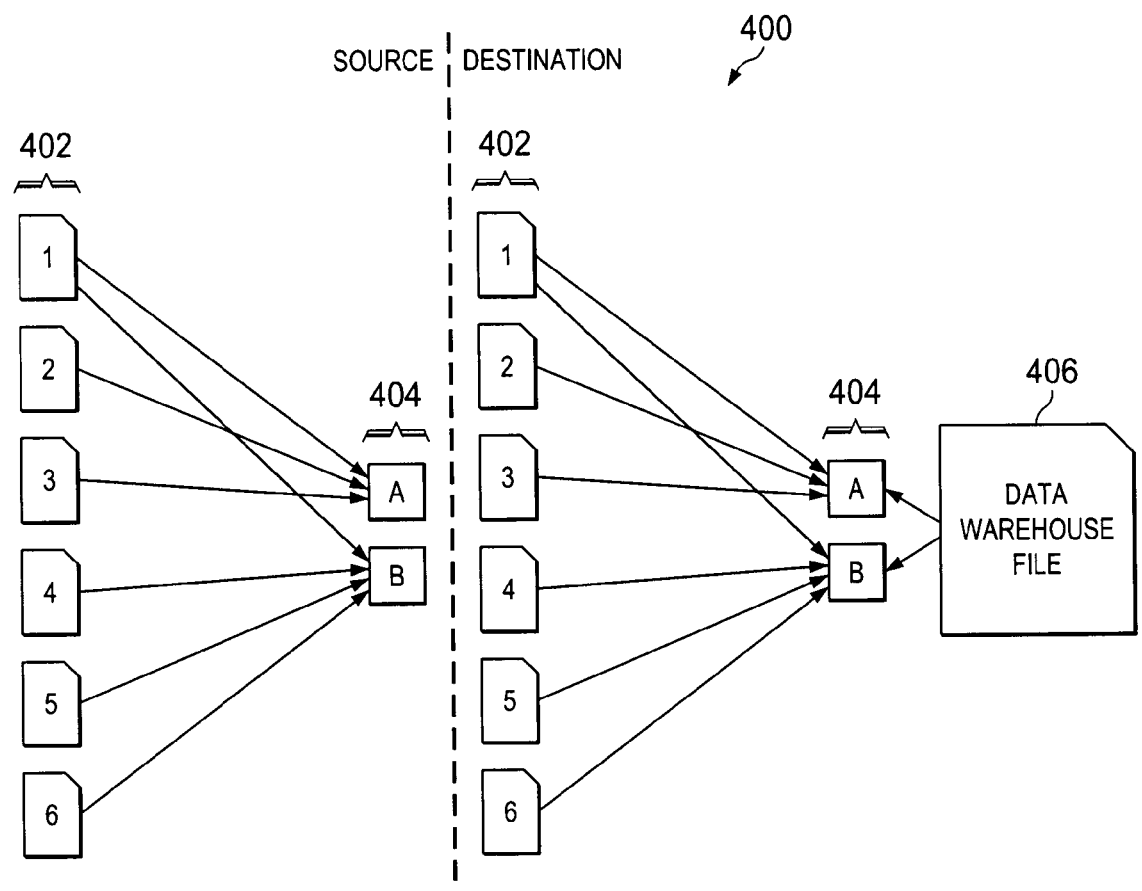
FIG. 4 is an illustration of an example scenario in which data blocks and metadata describing how the data blocks relate to files are sent from a source storage subsystem to a destination storage subsystem.

Moreover, FIG. 4 is an illustration of an example relationship between files and blocks at the source (a primary volume) and at the destination (the backup volume). FIG. 4 is provided to further illustrate the principles of FIG. 3, and it is exemplary only. Files 402 are labeled 1-6, and it is assumed that each of the individual files 1-6 is associated with an Mode that has a corresponding number 1-6. Arrows are drawn from files 402 to data blocks 404 to illustrate which data blocks 404 correspond to which files.

Data warehouse file 406 is a file stored at the backup volume that includes the volume to be backed up. Data warehouse file 406 acts as a warehouse for the data blocks 404 as the data blocks 404 are transferred in the first phase by the backup manager. In the next phase, when the file metadata is transferred, the file metadata is added to data warehouse file 406. Then the backup manager saves the content of the data warehouse file 406 to non-volatile memory for backup. It should be noted that the data warehouse file 406 is optional, and in other embodiments, data warehouse file 406 may be omitted.

Returning to FIG. 3, in action 302 a plurality of data blocks are transferred from the primary storage subsystem to the backup storage subsystem by the data manager. For instance, data blocks 404 (labeled A and B) may be transferred to the backup storage subsystem. The actions of block 301 are part of the first phase of the transfer.

In action 304, the deduplication engine generates fingerprints for each of the data blocks. One example of generating a fingerprint includes hashing a block using an algorithm, such as Message Digest algorithm 5 (MD5), to generate a number that is much smaller in bit size than the original data block but still provides an indication of the contents of the data block. MD5 is exemplary only, as any appropriate fingerprinting algorithm can be used by various embodiments.

In action 306, the deduplication engine generates a data log using the data blocks and the fingerprints. The data log includes an entry for each data block that was transferred to the backup storage subsystem. Each entry has a field for a data block name and the fingerprint for the data block. The data block name may include a virtual volume block number, as described above, or any other appropriate name. An example data log for the scenario shown in FIG. 4 is provided as Table 1, where the block names are A and B, and the fingerprints are FP1 and FP2. Each row in Table 1 represents an example data log entry. Further in this example, the data log (and reference log and change log described in more detail below) may be stored in Random Access Memory (RAM) in the storage subsystem during the actions of method 300.

TABLE 1

| Data Block Name | Fingerprint |
|---|---|
| A | FP1 |
| B | FP2 |

In action 308, information relating the data blocks to the files is transferred from the primary storage subsystem to the backup storage subsystem by the backup manager. In this example such information includes Mode numbers for the files, file block numbers for the blocks associated with the files, and names of the blocks associated with the files. In the example of FIG. 4, the Mode numbers are the same as the file labels, 1-6. The file block numbers describe how a particular block is numbered within a file to which it is associated. For instance, when a file has only one block, that block may have the file block number zero. However, when a file has more than one block, such as file 1 being associated with data blocks A and B in FIG. 4, one block may have the file block number zero and the other block may have the file block number one. Also, a data block may be associated with more than one file or file portion; in such instances, more than one file block number will reference the same data block. The data block names are the same as described at action 306. In the examples below, it is noted that references to multiple files also includes references to multiple file portions of the same file or different files. Further in this example, action 308 includes transferring the data block names with the file block numbers so that a relationship between the data block names and file block numbers is preserved.

In action 310, the deduplication engine generates a reference log using the information from action 308. The reference log has one entry for each individual file block number. Each entry in the reference log includes the following fields: Mode number for a particular file, file block number for a particular data block associated with that file, and data block name for that data block. An example reference log for the scenario of FIG. 4 is provided as Table 2. Each row in Table 2 represents an example reference log entry.

TABLE 2

| Inode Number | File Block Number | Data Block Name |
|---|---|---|
| 1 | 0 | A |
| 1 | 1 | B |
| 2 | 0 | A |
| 3 | 0 | A |
| 4 | 0 | B |
| 5 | 0 | B |
| 6 | 0 | B |

In action 312, the deduplication engine merges the data log and the reference log to generate the change log. The merging in action 312 takes advantage of a commonality between the data log and the reference log—the fact that each log entry includes data block name. In some instances, the data log and the reference log are in no particular order, and action 312 includes sorting each log by data block name. After sorting by data block name (where B is less than A) in ascending order, the example reference logs of Tables 1 and 2 may be rearranged by the deduplication engine as shown in Table 1.1 and Table 2.1, respectively.

TABLE 1.1

| Data Block Name | Fingerprint |
|---|---|
| B | FP2 |
| A | FP1 |

TABLE 2.1

| Inode Number | File Block Number | Data Block Name |
|---|---|---|
| 1 | 1 | B |
| 4 | 0 | B |
| 5 | 0 | B |
| 6 | 0 | B |
| 1 | 0 | A |
| 2 | 0 | A |
| 3 | 0 | A |

The change log has at least one entry for each data block, and in this example has as many entries as does the reference log. Generating the change log may further include correlating the entries in each of the logs to associate the Mode number and the file block number pairs of the reference log with the fingerprints of the data log. The change log includes information from the data log (fingerprints) and the reference log (Mode numbers, file block numbers) and combines the information in a single log. An example change log is shown for the scenario of FIG. 4 as Table 3.

TABLE 3

| Inode Number | File Block Number | Data Block Name | Fingerprint |
|---|---|---|---|
| 1 | 1 | B | FP2 |
| 4 | 0 | B | FP2 |
| 5 | 0 | B | FP2 |
| 6 | 0 | B | FP2 |
| 1 | 0 | A | FP1 |
| 2 | 0 | A | FP1 |
| 3 | 0 | A | FP1 |

Action 314 includes performing deduplication by using the change log to check for duplication within fingerprints of the data blocks. In order to identify duplicate fingerprints, the deduplication engine may sort the change log by fingerprint. For instance, each fingerprint may include an alphanumeric hash value (or Boolean hash value or any other appropriate hash value), and the deduplication engine may sort by hash value. Duplications are indicated by identical hashes, which are adjacent after sorting. If a duplicate fingerprint is found, the deduplication engine retrieves the actual data blocks from the volume and performs a byte-by-byte comparison of the data blocks. If the byte-by-byte comparison verifies that the data blocks are duplicates, the deduplication engine replaces one of the data blocks with a pointer to the single, retained copy.

It is worth noting that in the example change log of Table 3 (above), many of the entries have identical fingerprints as a result of multiple files referencing the same individual data blocks. For instance, data block A (having fingerprint FP1) is associated with inode numbers 1, 2, and 3; as a result, FP1 appears three times in Table 3. Accordingly, a simple check for duplicate fingerprints in Table 3 may not accurately identify duplicate data blocks, at least without accounting for block-sharing among the files. Various embodiments provide a technique to generate a compact change log that omits redundant entries where data blocks have the same name.

In one embodiment, action 312 includes the deduplication engine performing additional processes to generate a compact change log that is different from the change log of Table 3 by including one entry for each data block and discarding other entries for the same data block. Accordingly, the data log and reference log are sorted by the deduplication engine, as shown in Tables 1.1 and 2.1. Then the deduplication engine correlates the entries in the logs as follows. The first entry in the sorted data log is B, FP2. The deduplication engine then examines the first entry in the sorted reference log to discern whether the data block name field also includes B. In this example, it does, so the deduplication engine adds an entry to the change log that merges the first entry of the data log with the first entry of the reference log, as shown in the first entry of Table 3.1.

Next, the deduplication engine goes to the second entry in the sorted data log (Table 1.1), which is A, FP1. The deduplication engine then examines the first entry in the sorted reference log (Table 2.1) to discern whether the data block name field also includes A. Upon discerning that the first entry in the sorted reference log does not include a block name field of A, the deduplication engine moves to the next entry, then the next entry, and so on. Upon examining the fifth entry down, the deduplication engine detects the match between the data block name fields and merges the two entries to create a second entry in the change log, as shown in Table 3.1. There are no more entries in the data log that have yet to be correlated, so that the generation of the change log in Table 3.1 is complete.

TABLE 3.1

| Inode Number | File Block Number | Data Block Name | Fingerprint |
|---|---|---|---|
| 1 | 1 | B | FP2 |
| 1 | 0 | A | FP1 |

Thus, according to the example immediately above, the deduplication engine does an entry-by-entry check and skips entries in the reference log that share a data block name with an entry already placed in the change log. Or put another way, only a first entry in a reference log for a particular block name is used for the change log—the rest are omitted. Of course, other embodiments may generate a compact change log using any appropriate technique. For instance, another embodiment may build a change log similar to that illustrated in Table 3 and then go entry-by-entry in the change log to eliminate entries that repeat a data block name. In another example, one or both of Tables 1.1. and 2.1 include entries for time stamps, and the deduplication engine selects entries in order from later time stamps to older time stamps, thereby generating a compact change log from the newest-in-time entries. In either case, each data block name is represented once in the change log so that each entry includes a unique data block name.

Returning to action 314, the deduplication engine then checks the change log for redundant fingerprints. Action 314 may include sorting the change log by the underlying hash value and then checking each adjacent pair of entries for a duplicated fingerprint. In the example of Table 3.1, the deduplication engine has only one adjacent pair of entries, and it checks FP1 against FP2 for duplication of hash value.

In a scenario wherein the fingerprints FP1 and FP2 have the same hash value, the deduplication engine loads the underlying data blocks from the nonvolatile storage medium and checks them bit-by-bit to verify redundancy. If the check indicates duplication, the deduplication engine eliminates the duplication by not saving the redundant block and replacing pointers to any redundant blocks with pointers to the single remaining copy; otherwise, the deduplication engine leaves the data blocks as-is. After the deduplication engine completes deduplication, the backup manager and/or the deduplication engine saves the deduplicated data blocks and file information to the backup volume (e.g., volume 207 of FIG. 2).

Method 300 of FIG. 3 is exemplary only, and the scope of embodiments is not limited to the exact configuration of method 300. Other embodiments may add, omit, rearrange, or modify one or more actions, as appropriate.

For instance, some embodiments further include the deduplication engine saving the change log to a fingerprint database that is saved with the backup volume. The fingerprint database provides a fingerprint record of all, or nearly all, of the data blocks previously saved to the backup volume. The entries of the change log can be added by the deduplication engine to the fingerprint database after the change log is checked for duplication and duplicate entries are removed from the change log. Some systems may further include the deduplication engine checking the entries of the change log against the entries of the fingerprint database to determine whether newly-saved data blocks duplicate previously-saved data blocks.

Furthermore, various embodiments may repeat the backup and deduplication operation of method 300. For instance, the backup manager may schedule a backup operation every day, every week, other appropriate frequency or in response to an event, such as an administrator requesting a backup. The embodiments described above perform the deduplication operation at each of the backup operations.

Additionally, the embodiments herein may further include handling both conventional deduplication as well as deduplication processes described above. Such feature includes managing and coordination the processing of conventional single-phase backup and new multi-phase backup at the destination. Such an embodiment may include more than one backup manager saving data and metadata to the same backup volume, where one backup manager is a conventional, single-phase backup manager, and another backup manager can implement multi-phase backup. Furthermore, some embodiments may provide for priority of change log processing. For instance, some embodiments give priority to older change logs, though any appropriate priority scheme may be used.

Various embodiments may include one or more advantages over other techniques. For instance, various embodiments perform data block fingerprinting based on data received in a first phase of the information transfer, where the first phase transfers each data block once. Therefore, such embodiments create only as many fingerprints as there are data blocks. By contrast, a fingerprinting operation based on file information might create multiple fingerprints for a given data block if the given data block is shared among multiple files. Furthermore, various embodiments provide an efficient manner of merging data block information with file information to create a change log for use in a file-based storage system.

When implemented via computer-executable instructions, various elements of embodiments of the present disclosure are in essence the software code defining the operations of such various elements. The executable instructions or software code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information. One or more processors at the storage server (e.g., server 202 of FIG. 2), the storage subsystems (e.g., subsystems 204 and 206), or elsewhere in the network storage system may execute such instructions to provide one or more of the actions of method 300 (FIG. 3).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
receiving a plurality of data blocks at a secondary storage subsystem from a primary storage subsystem,
receiving metadata at the secondary storage subsystem from the primary storage subsystem, the metadata describing relationships between the plurality of blocks and a plurality of files;
generating a first log in response to receiving the plurality of data blocks, where the first log includes a first plurality of entries, one entry for each of the data blocks, in which each entry of the first plurality of entries includes a name for a respective data block and a fingerprint of the respective data block;
generating a second log in response to receiving the metadata, where the second log includes a second plurality of entries, in which each entry of the second plurality of entries includes a name for one of the data blocks and a metadata descriptor of one of the files; and
merging the first log with the second log to generate a change log, which associates fingerprints determined from the first log with respective ones of the files determined from the second log.

2. The method of claim 1 in which merging the first log with the second log comprises:
sorting the first log by data block name;
sorting the second log by data block name; and
correlating entries in the first log with entries in the second log to generate entries in the change log, in which each entry in the change log includes a data block name, a data block fingerprint, and a number identifier of one of the data blocks within one of the files.

3. The method of claim 2 in which correlating entries comprises:
skipping one or more entries in the second log, the one or more entries including redundant block names, to generate the change log so that each entry in the change log includes a unique block name.

4. The method of claim 2 in which correlating entries comprises:
correlating each entry of the first log with only one entry of the second log to generate the change log so that each entry in the change log includes a unique block name.

5. The method of claim 1, wherein identifying redundancies in the change log comprises:
checking for data block redundancies within the plurality of data blocks by comparing two or more fingerprints in the change log.

6. The method of claim 1 further comprising:
saving the change log to a fingerprint log, wherein the fingerprint log stores multiple previous change logs.

7. The method of claim 1 in which generating the first log comprises:
generating a fingerprint for each one of the data blocks.

8. The method of claim 1 in which eliminating redundant ones of the blocks from the secondary storage subsystem comprises:
replacing redundant ones of the data blocks with pointers to retained ones of the blocks.

9. The method of claim 1 further comprising:
saving at least a subset of the data blocks and a subset of the metadata to non-volatile memory of the secondary storage subsystem as a backup.

10. A non-transitory machine readable medium having stored thereon instructions for performing a method of data backup and deduplication, comprising machine executable code which when executed by at least one machine, causes the machine to:
create a first log based on a plurality of data blocks transferred for backup, wherein the first log includes entries for each of the data blocks, each entry of the first log listing a block name and an identifying hash;
create a second log based on metadata relating the plurality of blocks to the plurality of files, wherein the second log includes entries associating the plurality of data blocks with the plurality of files, each entry listing a block name, metadata describing a file, and an identifier of a block within a file; and generate a change log from the first log and the second log, the change log including entries associating a respective file with a respective identifier of the block within the file from the second log and an identifying hash from the first log; and eliminate redundant ones of the blocks from the secondary storage subsystem in response to identifying redundancies in the change log.

11. The non-transitory machine readable medium of claim 10 wherein the eliminating redundant ones of the data blocks includes causing the machine to:

check for data block redundancies within the plurality of data blocks by comparing two or more identifying hashes in the change log.

12. The non-transitory machine readable medium of claim 10 in which generating the change log includes causing the machine to:

sort both the first log and the second log by block name;

correlate each entry in the first log with at least one of the entries in the second log.

13. The non-transitory machine readable medium of claim 10 in which eliminating redundant ones of the blocks includes causing the machine to:

replace redundant ones of the data blocks with pointers to retained ones of the blocks.

14. The non-transitory machine readable medium of claim 10 in which generating the change log includes causing the machine to:

sort the first log by data block name;

sort the second log by data block name; and correlate entries in the first log with entries in the second log to generate entries in the change log, in which each entry in the change log includes a data block name, a data block identifying hash, and an identifier of one of the data blocks within one of the files.

15. The non-transitory machine readable medium of claim 14 in which correlating entries includes causing the machine to:

skip one or more entries in the second log, the one or more entries including redundant block names, to generate the change log so that each entry in the change log includes a unique block name.

16. The non-transitory machine readable medium of claim 14 in which correlating entries includes causing the machine to:

correlate each entry of the first log with only one entry of the second log to generate the change log so that each entry in the change log includes a unique block name.

17. The non-transitory machine readable medium of claim 10, wherein identifying redundancies in the change log includes causing the machine to:

check for data block redundancies within the plurality of data blocks by comparing two or more fingerprints in the change log.

18. A computing device comprising:

a memory containing machine readable medium comprising machine executable code having stored thereon instructions for performing a method of data backup and deduplication;

a processor coupled to the memory, the processor configured to execute the machine executable code to:

generate a data log for a plurality of data blocks transferred from a primary storage subsystem, the data log having a first plurality of entries, each entry including block name and block fingerprint for a respective block of the plurality of data blocks;

generate a reference log using information relating the plurality of data blocks to a plurality of files, the reference log including a second plurality of entries, each entry including block name for one of the data blocks and metadata describing one of the files;

create a change log from the data log and the reference log, the change log having at least one entry for each of the data blocks, and the change log including a third plurality of entries, each entry of the third plurality associating a respective file determined based on the reference log with a respective block name and a block fingerprint determined based on the data log; and eliminate redundant ones of the blocks from a secondary storage subsystem in response to identifying redundancies in the change log.

19. The computing device of claim 18 in which the computing device is included in a storage server in a storage subsystem.

20. The computing device of claim 18 in which the computing device is included in a storage subsystem.

* * * * *

UNITED STATES PATENT AND TRADEMARK OFFICE
CERTIFICATE OF CORRECTION

| | | |
|---|---|---|
| PATENT NO. | : 9,170,748 B2 | Page 1 of 1 |
| APPLICATION NO. | : 14/509892 | |
| DATED | : October 27, 2015 | |
| INVENTOR(S) | : Bharadwaj Vellore Ramesh et al. | |

It is certified that error appears in the above-identified patent and that said Letters Patent is hereby corrected as shown below:

In the specification

Column 5, lines 7 and 8: replace "Modes" with -- inodes --.

Column 5, lines 21 and 32: replace "Mode" with -- inode --.

Column 7, lines 1, 55, and 58: replace "Mode" with -- inode --.

Column 8, lines 13, 63, and 67: replace "Mode" with -- inode --.

Signed and Sealed this
Fifth Day of July, 2016

Michelle K. Lee
*Director of the United States Patent and Trademark Office*